United States Patent
Sommer et al.

(10) Patent No.: US 7,011,336 B2
(45) Date of Patent: Mar. 14, 2006

(54) AIRBAG MODULE WITH A DEFLECTOR HOLDER

(75) Inventors: Karl-Heinz Sommer, Stockdorf (DE); Thomas Reiter, Dachau (DE); Peter Kleeberger, München (DE); Jörg Albert, Germering (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/307,227

(22) Filed: Nov. 27, 2002

(65) Prior Publication Data

US 2003/0141704 A1 Jul. 31, 2003

(30) Foreign Application Priority Data

Nov. 27, 2001 (DE) .............................. 101 57 784

(51) Int. Cl.
*B60R 2/16* (2006.01)
*B60R 21/26* (2006.01)
(52) U.S. Cl. .................................... 280/728.2; 280/740
(58) Field of Classification Search ............. 280/728.2, 280/728.3, 730.1, 730.2, 731, 732, 736, 740, 280/742, 743.1, 743.2
See application file for complete search history.

(56) References Cited

U.S. PATENT DOCUMENTS

| | | | |
|---|---|---|---|
| 4,332,398 A | | 6/1982 | Smith |
| 5,398,968 A | * | 3/1995 | Emambakhsh et al. .. 280/743.1 |
| 5,647,608 A | * | 7/1997 | Damman et al. ........ 280/728.2 |
| 5,727,812 A | * | 3/1998 | Dykstra et al. ............. 280/731 |
| 5,806,879 A | * | 9/1998 | Hamada et al. .......... 280/728.2 |
| 5,873,598 A | * | 2/1999 | Yoshioka et al. ........... 280/740 |
| 5,992,874 A | * | 11/1999 | Sugiyama et al. ....... 280/728.2 |
| 6,022,046 A | * | 2/2000 | Isomura et al. .......... 280/743.2 |
| 6,109,649 A | * | 8/2000 | Adomeit et al. ............ 280/740 |
| 6,113,136 A | * | 9/2000 | Hamada et al. ............. 280/731 |
| 6,149,192 A | * | 11/2000 | Swann et al. ............... 280/740 |
| 6,299,203 B1 | * | 10/2001 | Muller ....................... 280/736 |
| 6,419,266 B1 | * | 7/2002 | Morfouace et al. ......... 280/740 |
| 6,588,793 B1 | * | 7/2003 | Rose ....................... 280/728.2 |
| 2002/0130495 A1 | * | 9/2002 | Lotspih et al. ........... 280/730.2 |
| 2004/0108691 A1 | * | 6/2004 | Dahmen .................. 280/728.2 |

FOREIGN PATENT DOCUMENTS

| | | |
|---|---|---|
| DE | 2122018 | 5/1973 |
| DE | 3544704 | 6/1987 |
| DE | 29806402 | 9/1998 |
| DE | 19736243 | 2/1999 |
| EP | 1188624 | 3/2002 |
| WO | WO-96/15923 | 5/1996 |

* cited by examiner

*Primary Examiner*—Paul N. Dickson
*Assistant Examiner*—Laura B. Rosenberg
(74) *Attorney, Agent, or Firm*—Madson & Austin

(57) ABSTRACT

An airbag module with a gas generator, a gas bag, a housing containing an exit opening for the deploying gas bag, and a holder. The gas generator and holder are located inside the gas bag, and the gas generator is fixed to the housing. The holder (19) has a support area (20) and at least one deflector segment (21, 22) directed toward the exit opening (13). The holder is placed between the gas generator (14) and the housing (10). The deflector segment at least partially surrounds the gas generator (14) and directs the gas generated by the gas generator (14) into at least one of a plurality of fold packets (16, 17, 18) of the gas bag (15) placed on both sides of the deflector segment (21, 22).

17 Claims, 6 Drawing Sheets

AIRBAG MODULE WITH A DEFLECTOR HOLDER

BACKGROUND OF THE INVENTION

1. Field of the Invention

The invention concerns an airbag module with a gas generator, a gas bag, a housing with an exit opening for the deploying gas bag, as well as a holder. The gas generator and the holder are located inside the gas bag and the gas generator is fixed radially and axially to the housing.

2. Description of Related Art

A related airbag module is described in DE 298 06 402 U1. In this regard, a holder, placed inside the gas bag and which fastens the gas bag to the housing using separate bolts passing through the fabric of the gas bag, is connected to the housing. The application piece is U-shaped which corresponds in its shape to the housing, which is also U-shaped. The housing has an exit opening, between its U-legs. The gas bag is folded up in the housing, and exit opening is closed with a cover. The U-shaped holder is coordinated in its dimensions to the housing in such a manner that a narrow region exists between the housing walls and the holder to house the gas bag. The gas bag itself is folded into the U-shaped housing between the exit opening and the holder.

Generally, in airbag modules, the requirement also exists to direct the gases released by the gas generator when it fires into predetermined areas of the folded gas bag by placing deflectors as gas directing surfaces, in this manner assuring a controlled or even sequential deployment of the gas bag. For example, DE 197 36 243 A1 discloses an air bag device in which the interior of a module housing is subdivided into differing areas or internal spaces for the placement of the gas generator, on the one hand, and of at least one or more fold packets of the folded gas bag, on the other hand. The intermediate walls cause a pre-determined introduction of the gas stream into a pre-determined folding area of the gas bag, which then, as it unfolds, extracts further folding regions of the gas bag from the housing and releases them for the introduction of gas.

The problem to be solved by the invention, therefore, is to provide an airbag module with the general characteristics of simple attachment for the folded gas bag and simple construction of the gas direction system.

The solution to this problem is shown in the content of the patent claims that follow this description, including advantageous embodiments and further developments of the invention.

SUMMARY OF THE INVENTION

In its basic form, the invention provides a holder placed between the gas generator and the housing with an attachment area. The holder has a deflector segment directed toward the exit opening and surrounding the gas generator externally. The deflector segment has a deflector surface to direct the gas generated by the gas generator into at least one of the fold packets of the gas bag placed on both sides of the deflector segment.

The invention also provides an advantage that the holder provided for attaching the gas bag may also be made in the shape of a deflector. The deflector, due to its shape, divides the interior of the housing into various partial spaces or into various inside rooms, in which at least two fold packets are placed and through which, as a result of the gas conducted by the holder itself, receive gas differently. As a result of the double function so arranged for the holder to fasten the gas bag, on the one hand, and to direct the gas, on the other hand, a decrease in the size and weight of the air bag module as well as simplification of its structure is provided. This results in saving manufacturing time and manufacturing costs.

According to a first embodiment of the invention, the gas generator may be placed in a corner area of the housing. The holder has a section which, on one side, encloses the gas generator, where a fold packet is placed between the gas generator and the exit opening, and a further fold packet in the interior space formed by the outside wall of the housing facing away from the gas generator. In this connection, the U-shaped holder may be provided with an additional segment running along the facing outside wall of the housing.

In an alternative embodiment, the gas generator may be placed in a central area of the housing. The holder is designed to be U-shaped with two deflector segments enclosing the gas generator between them. In this connection, the gas bag may be provided with two fold packets, each of which is placed in the interior space that exists between the deflector segment of the holder and the facing outside housing wall. A gas bag location connecting the two fold packets bridges the space located between the deflector segments and the gas generator placed therein. For the purpose of good deployment of the fold packets, the individual folds of the fold packets of the gas bag may be placed transversely to the direction of ejection of the gas bag from the housing.

In another alternative embodiment of the invention, three fold packets of the gas bag are provided, of which two fold packets are placed, each in the interior space between the deflector segments and the outer housing wall, and an intermediate fold packet between the gas generator and the exit opening. The individual folds of the outer packets may run transversely to the ejection direction of the gas bag and the individual folds of the central fold packet run in the ejection direction.

In order to obtain a greater variety in inflating the fold packets of the gas bag folded in the housing, according to one sample embodiment of the invention, at least one deflector segment passage opening is placed in the interior space defined by the deflector segment for the passage of gas from the gas generator.

In alternative embodiments of the invention, then, each deflector segment serving as a deflector surface may extend along a portion of the extension of the gas generator in the direction of the exit opening or corresponding to the extension of the gas generator in this direction or also extend beyond the gas generator in the direction of the exit opening.

The end of each deflector segment may be directed toward the exit opening from the housing is bent inward or outward with respect to the gas generator.

In an alternative embodiment of the invention, the gas generator may be placed centrally in the housing. The holder includes a gas generator with a deflector segment placed on one side, where three fold packets of the gas bag are provided, of which one fold packet is placed between the deflector segment and the outside housing wall. The other two fold packets are placed in the interior space of the housing divided off by the deflector segment in which the gas generator is placed. In this case, the deflector segment is placed on one side, and an extension that extends parallel to the exit opening from the housing surround the gas generator. One of the three fold packets is placed in the space between the extension of the deflector segment running parallel to the exit opening and the exit opening itself. According to one embodiment of the invention, the holder is connected to the housing.

In an especially suitable embodiment of the invention, the holder is placed without fastening between the gas generator and the housing. In this regard, the holder, in particular, is held fast by the gas generator without being firmly fixed to the gas bag or the gas generator or the housing on the side of the gas generator opposite the exit opening between the housing wall of the module housing and the gas generator. The holder absorbs the forces that arise during deployment of the gas bag and transmits them to the gas generator and its fastening to the module housing. Thus, the fastening of the gas bag in this sample embodiment is done in a kind of floating fastening because the gas bag fabric is guided without separate fixation or attachment around the holder. The holder is placed inside the gas bag, where the holder braces against the gas generator fastened inside the module housing, in the case of stressing due to the tensile forces applied to the gas bag as it deploys, and thereby transmits the forces. This has the advantage that the gas bag fabric is braced against the surface of the holder for the transmission of forces, and there is no point stress. As a result, no reinforcement will be applied in the manufacture of the gas bag. Also, the manufacture and installation of the airbag module are simplified, because no special measures are required on the gas bag fabric for the fastening of the holder.

Finally, according to one sample embodiment of the invention, the holder has a dimension coinciding with the parallel length of the gas generator in its support area oriented parallel to the housing floor; in this manner, an especially small design is assured for the airbag module, because only the necessary area of extension of the holder is used for the fastening of the gas bag fabric.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1a through 6c, is not intended to limit the scope of the invention, as claimed, but is merely representative of presently preferred embodiments of the invention.

Figure 1A:
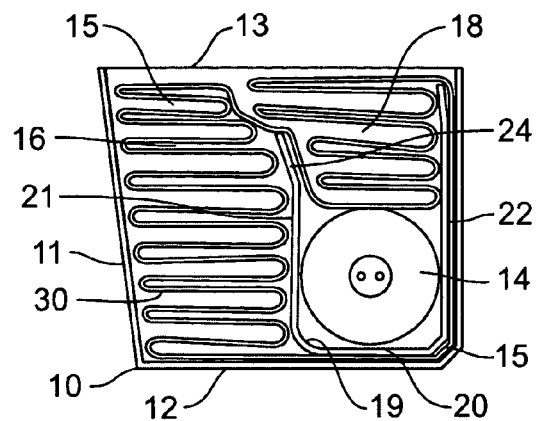
FIGS. 1a–1c show an airbag module with a gas generator placed in a corner area and a holder with a one-legged deflector segment in its original condition and in different stages of deployment of the gas bag.
Figure 1B:
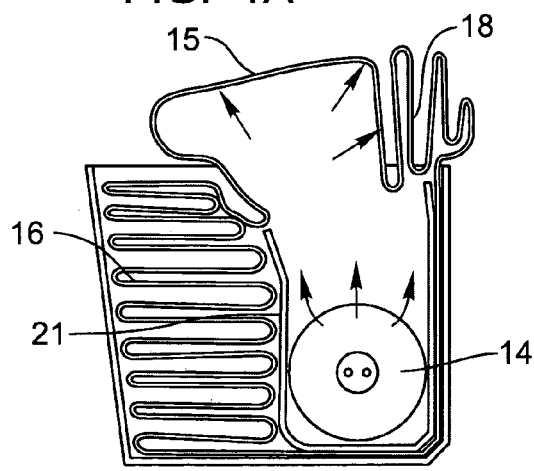
Figure 1C:
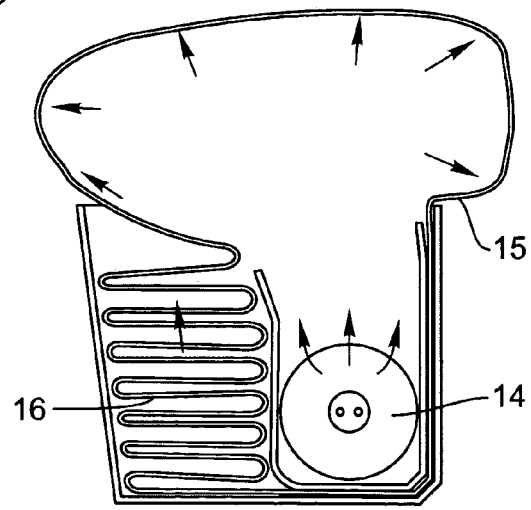

The housing 10 represented in FIGS. 1a through 1c of an airbag module consists of a floor area 12 and outside walls 11 extending upward therefrom, which, between themselves, define an exit opening 13 for the gas bag 15 folded in the interior of the housing 10. In the housing 10, generally a gas generator 14 is placed and fixed to the housing 10. The gas generator 14 may be fixed radially, axially, or radially and axially to the housing.

In the sample embodiment represented in FIGS. 1a through 1c, the gas generator 14 is placed in a corner area of the housing 10 near the floor area 12, where the gas generator 14 is inside the folded gas bag 15 and placed in the interior of a U-shaped holder 19. The holder 19 has a leg 22 extending parallel to the outside wall 11 of the housing 10, which, in the sample embodiment represented, works not as a deflector, but only encloses a gas bag position for the folded gas bag 15 between it and the outside wall 11. The same applies for the support area 20 of the holder 19. The deflector segment 21, which extends in the direction of the exit opening 13 on the inside of the attachment area of the holder 19, serves at the same time as a limitation for two partial spaces in which two fold packets 16 and 18 of the gas bag 15 are placed. A fold packet 18 is placed between the gas generator 14 and the exit opening 13 of the housing 10, while a second fold packet 16 is accommodated in the space lying between the deflector segment 21 and the opposite outside wall 11 of the housing. Both folding bags 16, 18 have individual folds 30 running parallel to the exit opening 13 or transverse to the expulsion direction of the gas bag. In the embodiment represented in FIGS. 1a–1c, the end 24 of the deflector segment 21 is bent outward, that is, away from the gas generator 14.

In all sample embodiments represented and to be described below, the holder, with deflector segment or deflector segments, is laid, without being firmly fixed to the gas bag 15 or the gas generator 14 or the housing 10, into the interior of the gas bag 15, so that, upon deployment of the gas bag, as shown in FIGS. 1b and 1c, the holder is pulled with its support area 20 from the gas bag position between the support area 20 and the floor area 12 of the housing, against the gas generator 14 and thereby transfers the corresponding forces to the gas generator and its fastening to the housing 10. The support area 20 may be oriented parallel to the housing floor 12, and it has a dimension that substantially coincides with the dimension of the gas generator, along a plane parallel to the support area.

In FIGS. 1b and 1c, the incipient deployment of the gas bag 15 due to the arrangement described of the fold packets in the housing can be recognized; it can be seen in which sequence the fold packets 18 followed by 16 are thrown out.

Figure 2A:
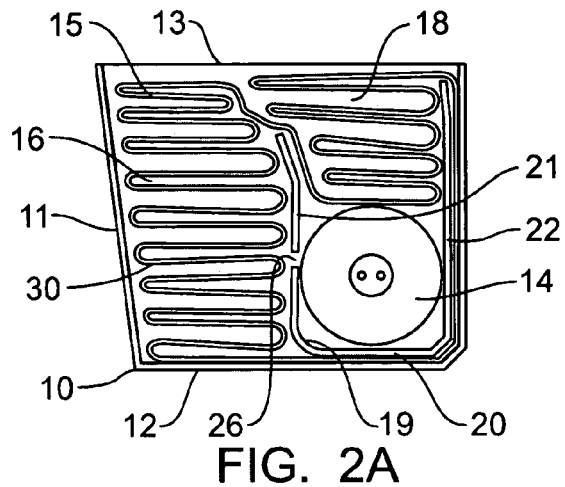
FIGS. 2a–2c show another sample embodiment of the airbag module in the representation in accordance with FIGS. 1a–1c, with additional gas passage openings in the deflector segment of the holder.
Figure 2B:
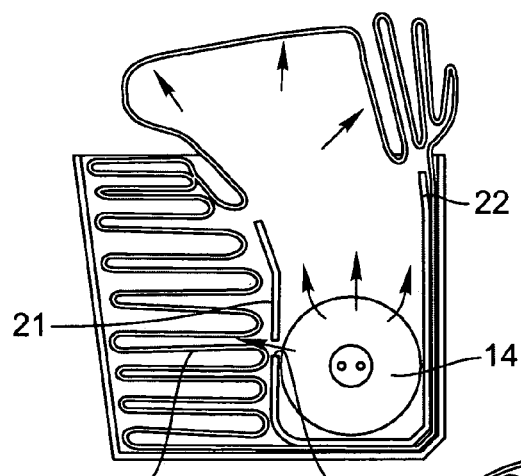
Figure 2C:
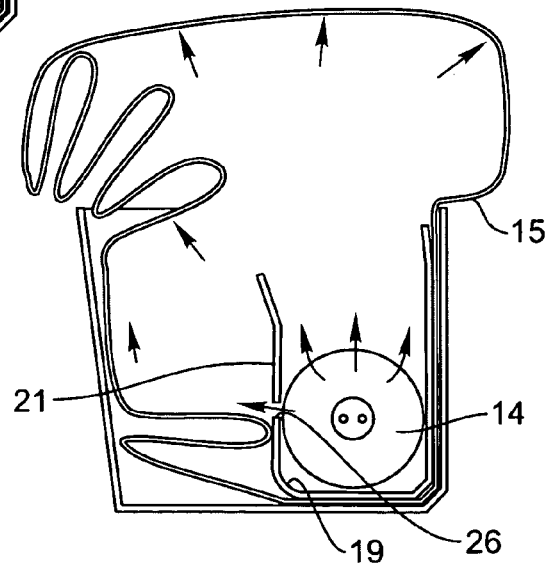

The sample embodiment represented in FIGS. 2a through 2c differs from the sample embodiment described in FIGS. 1a through 1c only through the placement of at least one additional gas passage opening 26 in the deflector segment 21, so that substantially parallel to the gas flow in the direction of the fold packet 18, simultaneously gas also flows through the gas passage opening 26 into the fold packet 16 beside the gas generator 14, and provides for its early deployment.

Figure 3A:
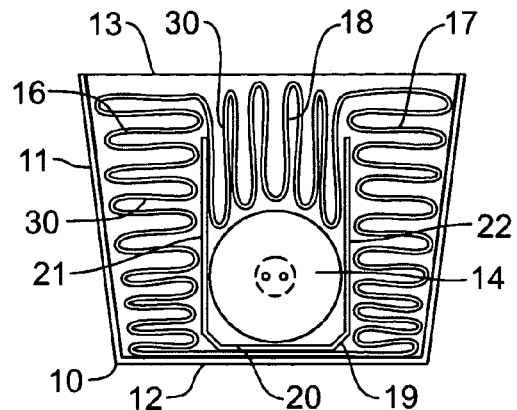
FIGS. 3a–3c show an air bag module with a centrally placed gas generator and a U-shaped holder placed on both sides of the gas generation, with deflector segments in a representation corresponding to FIGS. 1a–1c.
Figure 3B:
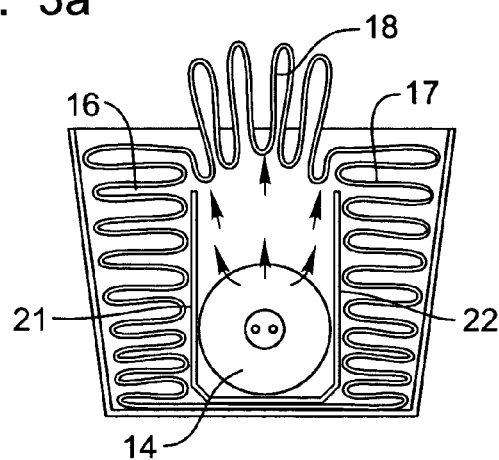
Figure 3C:
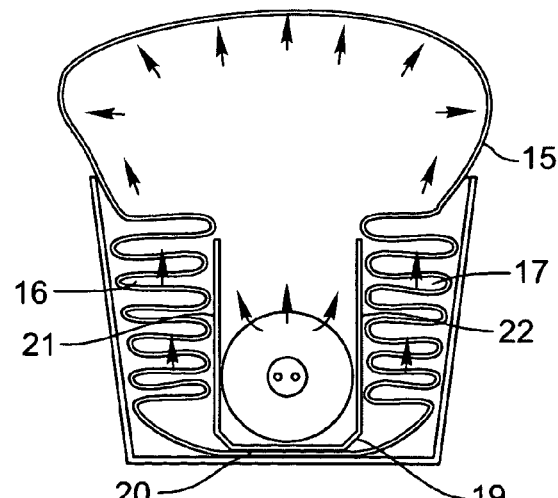

The sample embodiment represented in FIGS. 3a through 3c has a gas generator 14 placed centrally in the housing 10. In this orientation, leg 22 functions as a deflector segment, so that the U-shaped holder 19 has two deflector segments 21 and 22 with the gas generator 14 disposed between the deflector segments 21 and 22. Correspondingly, in this sample embodiment, three fold packets are provided, of which the outside two fold packets 16 and 17 are each placed in the intermediate space existing between the outer wall 11 and the neighboring deflector segment 21 or 22. In addition, there is placed a third fold packet 18 in the central area between the gas generator 14 and the exit opening 13. While the individual folds of the two outside fold packets run parallel to the exit opening 13, the individual folds 30 of the central fold packet 18 run in the expulsion direction of the gas bag 15 from the housing 10. FIGS. 3b and 3c show, in detail, the effect of the gas flow from the gas generator 14 on the deployment of the fold packets 18 as well as 16 and 17.

Figure 4A:
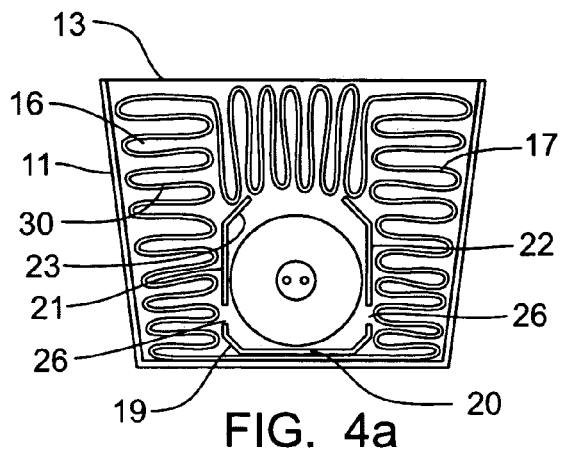
FIGS. 4a–4c show the subject of FIGS. 3a–3c with the addition of gas passage openings.
Figure 4B:
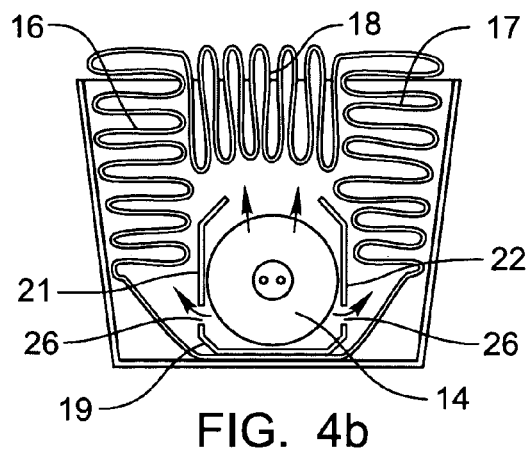
Figure 4C:
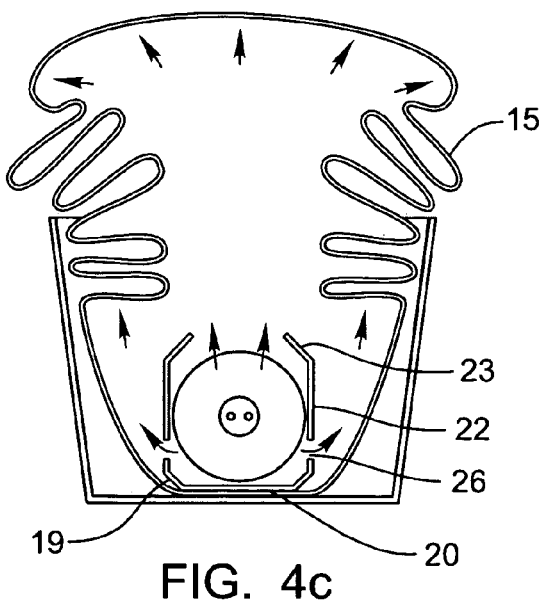

The embodiment represented in FIGS. 4a through 4c shows, as a supplement to the embodiment described in FIGS. 3a through 3c, supplementary deflector segments 21 and 22 of the holder 19, through which a more rapid deployment of the outside fold packets 16 and 17 is initiated. The ends 23 of the deflector segments 21 and 22 facing the exit opening 13 are bent inward to the gas generator. In addition, openings 26 allow gas from the gas generator 24 to enter fold packets 16 and 17 beside the gas generator 14 and provide for early deployment of the gas bag 15.

Figure 5A:
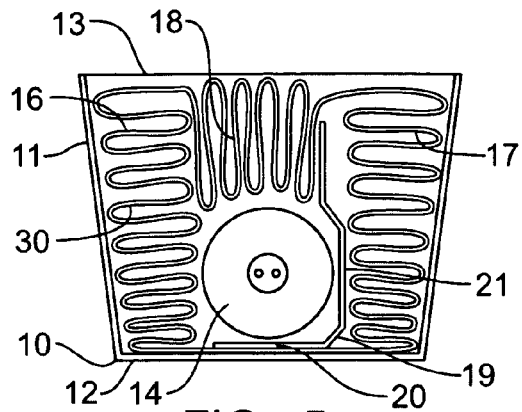
FIGS. 5a–5c show a further sample embodiment of the airbag module in a representation according to FIGS. 1a–1c, with a centrally placed gas generator and a one-legged holder.
Figure 5B:
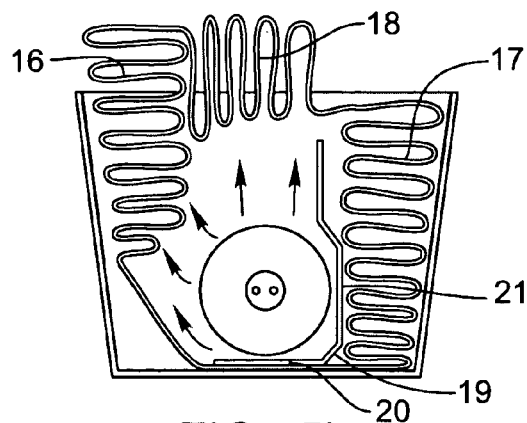
Figure 5C:
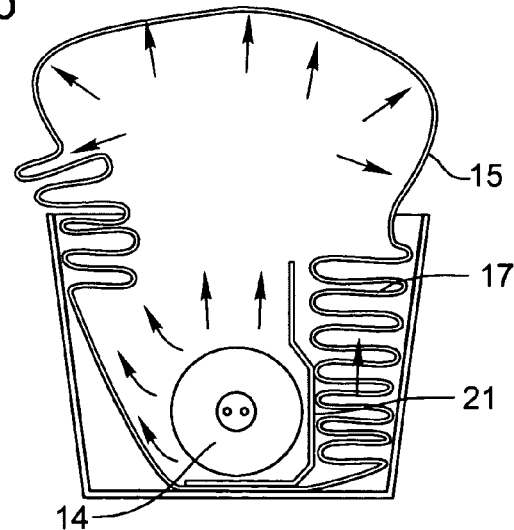

The sample embodiment shown in FIGS. 5a through 5c shows a centrally placed gas generator 14 and a holder 19 with one deflector segment 21, where the placement of the fold packets 16, 17, 18 corresponds in principle to that of the sample embodiments described in FIGS. 3a–3c and 4a–4c. The removal of a deflector segment and the asymmetrical shape of the holder with respect to the deflector segments results in the deployment process represented in FIGS. 5b and 5c.

Figure 6A:
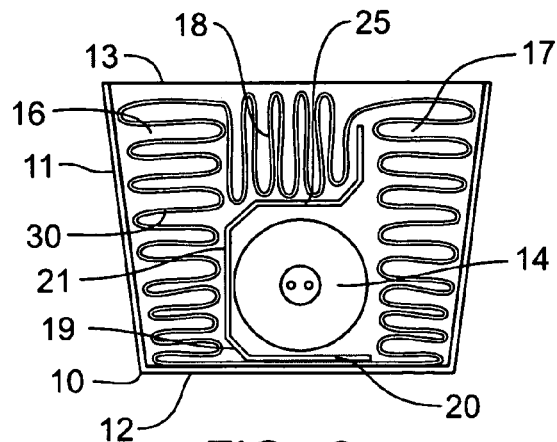
FIGS. 6a–6c show the subject of FIGS. 5a–5c with an extension added to the deflector segment of the holder extending parallel to the passage opening of the housing.
Figure 6B:
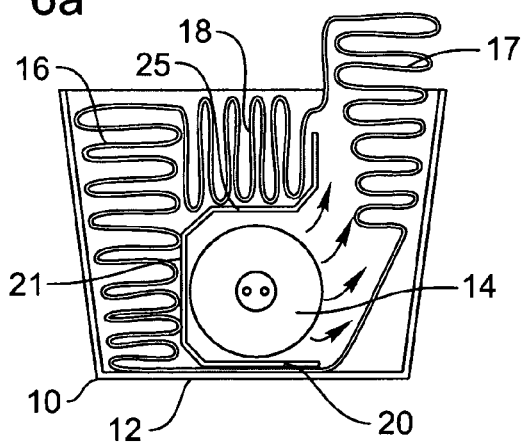
Figure 6C:
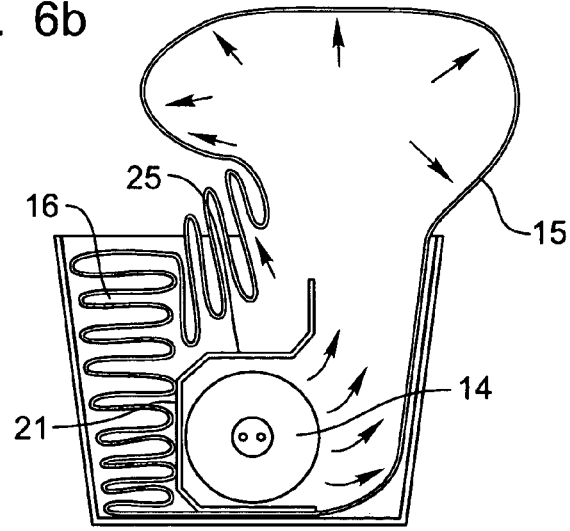

In the sample embodiment shown in FIGS. 6a through 6c, with a centrally located gas generator 14 and a holder 19, with only one leg and therefore only one deflector segment 21, the free end of the deflector segment 21, unlike the sample embodiment according to FIGS. 5a–5c, transitions into an extension 25 which extends parallel to the exit opening 13, where the center fold packet 18 is located in the area between the extension 25 and the exit opening 13. As a result, the beginning of the deployment sequence is transferred to the fold packet 17 facing the open side of the holder 19, which provides for the pulling out of the further fold packet 18 and then 16.

The characteristics of the subject of these documents revealed in this description, in the patent claims, in the summary and the drawings, can be utilized individually or in any combination for the creation of the invention in its various embodiments. The present invention may be embodied in other specific forms without departing from its structures, methods, or other characteristics as described herein and claimed hereinafter. The described embodiments are to be considered only as illustrative, and not restrictive.

What is claimed is:

1. An airbag module comprising:
   a gas generator;
   a gas bag having a plurality of fold packets;
   a housing containing a floor area, outside walls extending upward from the floor area, and an exit opening through which the gas bag is deployed; and
   a holder having a support area and at least one deflector segment directed toward the exit opening and surrounding the gas generator, wherein the gas generator and holder are located inside the gas bag, wherein the gas generator is fixed to the housing, wherein the holder is located between the gas generator and the housing and directs gas generated by the gas generator into at least one of the fold packets of the gas bag, wherein the gas generator is placed in a corner area of the housing and the holder has a deflector segment enclosing the gas generator on one side, wherein a fold packet is located between the gas generator and the exit opening and a further fold packet is located in an internal space formed between the deflector segment and the outside wall of the housing facing away from the gas generator.

2. The airbag module in accordance with claim 1, wherein individual folds of the fold packets of the gas bag are placed transversely to an expulsion direction of the gas bag from the housing.

3. The airbag module in accordance with claim 1, wherein the deflector segment comprises at least one gas passage opening to allow gas from the gas generator to pass into an internal space between the deflector segment and one of the outside housing walls.

4. The airbag module in accordance with claim 1, wherein the deflector segment extends along a longitudinal direction of the gas generator in a direction of the exit opening.

5. The airbag module in accordance with claim 1, wherein the deflector segment extends beyond the gas generator in a direction of the exit opening.

6. The airbag module in accordance with claim 1, wherein the deflector segment has an end directed towards the exit opening of the housing and wherein the deflector segment end is bent in the direction toward the gas generator.

7. The airbag module in accordance with claim 1, wherein the deflector segment has an end directed toward the exit opening of the housing and wherein the deflector segment end is bent outward with respect to the gas generator.

8. The airbag module in accordance with claim 1, wherein the holder is connected to the housing.

9. The airbag module in accordance with claim 1, wherein the holder is disposed between the gas generator and the housing without fastening.

10. The airbag module in accordance with claim 1, wherein the holder support area is oriented parallel to the housing floor, and wherein the support area has a dimension that substantially coincides with the dimension of the gas generator along a plane parallel to the support area.

11. The airbag module in accordance with claim 1, wherein the gas generator is fixed radially and axially to the housing.

12. An airbag module comprising:
    a gas generator;
    a gas bag having a plurality of fold packets;
    a housing containing a floor area, outside walls extending upward from the floor area, and an exit opening through which the gas bag is deployed; and
    a holder having a support area and at least one deflector segment directed toward the exit opening and surrounding the gas generator, wherein the gas generator and holder are located inside the gas bag, wherein the gas generator is fixed to the housing, wherein the holder is located between the gas generator and the housing and directs gas generated by the gas generator into at least one of the fold packets of the gas bag, wherein the gas generator is placed in a corner area of the housing and the holder has a deflector segment enclosing the gas generator on one side, wherein a fold packet is located between the gas generator and the exit opening and a further fold packet is located in an internal space formed between the deflector segment and the outside wall of the housing facing away from the gas generator, wherein the holder is U-shaped and has an additional deflector segment running alongside one outside wall of the housing.

13. An airbag module comprising:
a gas generator;
a gas bag having a plurality of fold packets;
a housing containing a floor area, outside walls extending upward from the floor area, and an exit opening through which the gas bag is deployed; and
a holder having a support area and at least one deflector segment directed toward the exit opening and surrounding the gas generator, wherein the gas generator and holder are located inside the gas bag, wherein the gas generator is fixed to the housing, wherein the holder is located between the gas generator and the housing and directs gas generated by the gas generator into at least one of the fold packets of the gas bag, wherein the gas generator is placed in a central area of the housing and the holder is U-shaped with two deflector segments that enclose the gas generator between the deflector segments, wherein three fold packets of the gas bag are provided, wherein two fold packets are outside fold packets, each placed in an internal space between one of the deflector segments and one of the outside housing walls, wherein a central fold packet is placed between the gas generator and the exit opening.

14. The airbag module in accordance with claim 13, wherein individual folds of the outside fold packets are placed transversely to an expulsion direction of the gas bag and individual folds of the central fold packet are placed to run in the expulsion direction of the gas bag.

15. The airbag module in accordance with claim 13, wherein the deflector segment extends over a portion of the gas generator in a direction toward the exit opening.

16. An airbag module comprising:
a gas generator;
a gas bag having a plurality of fold packets;
a housing containing a floor area, outside walls extending upward from the floor area, and an exit opening through which the gas bag is deployed; and
a holder having a support area and at least one deflector segment directed toward the exit opening and surrounding the gas generator, wherein the gas generator and holder are located inside the gas bag, wherein the gas generator is fixed to the housing, wherein the holder is located between the gas generator and the housing and directs gas generated by the gas generator into at least one of the fold packets of the gas bag, wherein the gas generator is placed in a central area of the housing and the holder is U-shaped with two deflector segments that enclose the gas generator between the deflector segments, wherein the holder has one deflector segment disposed on one side of the gas generator, wherein three fold packets of the gas bag are provided, of which one fold packet is placed between the deflector segment and one outside housing wall and the other two fold packets are placed in an internal space of the housing between the gas generator and another outside housing wall.

17. An airbag module comprising:
a gas generator;
a gas bag having a plurality of fold packets;
a housing containing a floor area, outside walls extending upward from the floor area, and an exit opening through which the gas bag is deployed; and
a holder having a support area and at least one deflector segment directed toward the exit opening and surrounding the gas generator, wherein the gas generator and holder are located inside the gas bag, wherein the gas generator is fixed to the housing, wherein the holder is located between the gas generator and the housing and directs gas generated by the gas generator into at least one of the fold packets of the gas bag, wherein the gas generator is placed in a central area of the housing and the holder is U-shaped with two deflector segments that enclose the gas generator between the deflector segments, wherein the holder has one deflector segment disposed on one side of the gas generator with an extension portion that extends parallel to the exit opening of the housing, wherein three fold packets of the gas bag are provided, wherein one of the three fold packets is placed above the extension running parallel to the exit opening.

* * * * *